United States Patent Office 2,753,805
Patented July 10, 1956

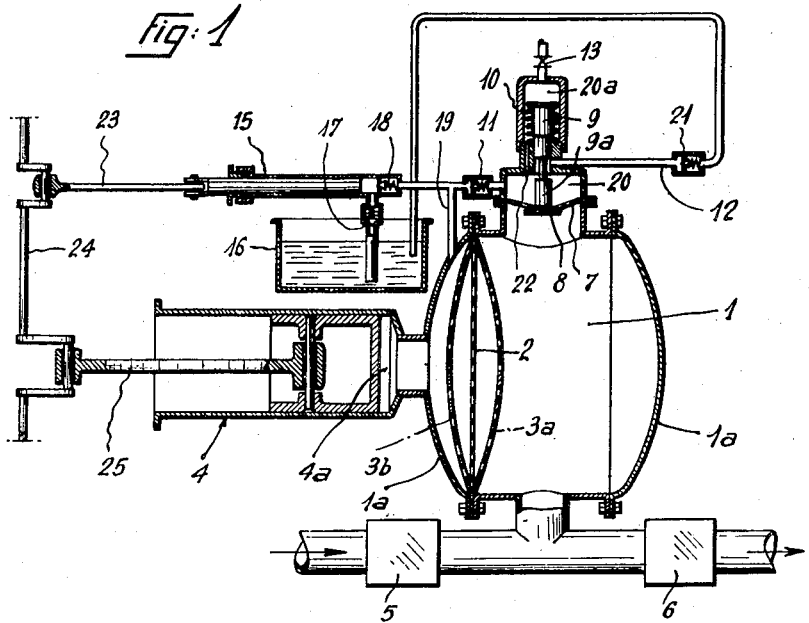
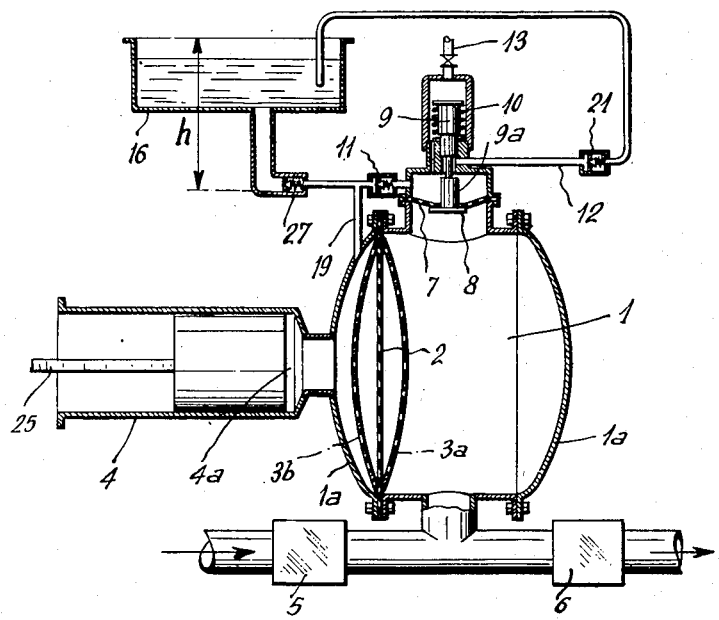

2,753,805

REGULATOR FOR DIAPHRAGM PUMPS

Jean Boivinet, Aix-en-Provence, France

Application June 21, 1955, Serial No. 516,817

Claims priority, application France June 24, 1954

5 Claims. (Cl. 103—44)

The present invention relates to a regulator designed for guarding against the differences in pressure which are exerted on the diaphragm of pumps of the type which will be called hereafter "diaphragm pumps," in order to avoid overstraining and damaging said diaphragms.

In a diaphragm pump, when a drop in pressure occurs on the discharge side, the pressures exerted on the two faces of the diaphragm no longer balance at the end of the discharge stroke; the diaphragm is then pressed against its seat owing to the excess pressure of the motive liquid. This results in a strain liable to damage the diaphragm when the latter is made of a material having insufficient mechanical features for supporting without any damage such an excess in pressure. This is practically the case of diaphragms made of plastic material, the use of which is nevertheless very interesting in various circumstances, especially when the problem is to circulate liquids which are corrosive to metallic diaphragms.

No pump is safe from a casual drop in pressure at its discharge end, and the diaphragms are always subject to the above drawbacks.

An object of this invention is to avoid such a drawback by means of a device for automatically regulating the difference between the pressures exerted on both sides of the operative diaphragm of the pump.

The device in accordance with the invention comprises a by-pass duct connected to the zone containing the motive liquid and means for opening said duct when an overpressure occurs in the said zone, these means being under the control of an additional diaphragm arranged in parallel relation with the motive diaphragm or diaphragms but which does not contribute to the pumping.

According to a feature of the invention, the said additional diaphragm is provided with adjusting means whereby it operates only from a predetermined value of the difference in the pressures exerted on its two faces.

The new device thus comprises an additional diaphragm which does not contribute to pumping, which is assembled in the body of the pump, and which is in contact on one side with the pumped liquid and on the other side with the motive liquid contained in an enclosure disposed on the passage of this liquid between the motive chamber of the pump and an exhaust duct. Means for closing or opening the exhaust duct (for example slide valves, check valves) are located in the said enclosure and connected with the additional diaphragm which controls them.

When an overpressure obtains in the motive liquid, relatively to the pumped liquid, the resulting inflection or yield of the additional diaphragm towards the pumped liquid, controls the opening of the said passage: a part of the motive liquid then flows from the corresponding chamber of the pump towards the exhaust duct, until the pressure equilibrium is restored on the opposite side of the diaphragm.

The exhaust duct conveniently leads to a tank from where the motive liquid may be returned to the pump.

The additional diaphragm is selected of such a flexibility that the inflection, which controls the opening of the passage, occurs for a predetermined differential pressure between the motive liquid and the pumped liquid.

According to another feature of the invention, this result is achieved by means, for example, of a spring preventing the additional diaphragm for yielding so long as the predetermined differential pressure is not reached.

The following description given by way of example in connection with the accompanying drawings will show how the invention may be carried out.

In the drawings:

Fig. 1 shows a diaphragm pump provided with a regulator in accordance with the invention and with a small auxiliary pump for the introduction of additional motive liquid.

Fig. 2 shows another diaphragm pump provided with a regulator but without any auxiliary pump.

In the drawings, 1 is a cylindrical pump casing closed by two curved bottoms 1a comprising at 2 a diaphragm oscillating between ported heads 3a and 3b which limit the deformation of the diaphragm 2. A motive piston 4 imparts a reciprocating motion to the motive liquid inside a chamber or compartment 4a. Additional motive liquid may be introduced into this chamber by means of a small auxiliary pump 15. This pump sucks up motive liquid from the tank 16 through a check valve 17 and discharges this liquid into the chamber 4a through the check valve 18 and the pipe 19. The suction valve 5 and the discharge valve 6 insure respectively the intake and the exhaust of the liquid pumped by the diaphragm 2, into and from the pump casing 1.

The pump casing 1 comprises, in its wall, a small additional diaphragm 7 which is designed for regulating purposes. The lower face of this diaphragm rests upon a flange 8 and is in contact with the pumped liquid; the upper face of this diaphragm is in contact with motive liquid which is contained in an enclosure 20.

The flange 8 is fast with a slide valve 9 which is upwardly urged by a spring 10. A return valve 11 connects the chamber 20 with the chamber 4a through the pipe 19. When the slide valve 9 rises, it uncovers the inlet of the exhaust duct 12 which is provided with a check valve 21 connecting the chamber 20 with the tank 16.

The chamber 20a which is located above the slide valve 9 communicates with the chamber 20 through a duct 22 and the air-valve 13 which is positioned at the top of the chamber 20a allows the filling of the whole volume located above the diaphragm 7 with motive liquid.

The pump 15 may be any conventional pump operating together with the motive pump 4; as shown in Fig. 1, the pump 15 may be a piston pump coupled, through a rod 23, to the crankshaft 24 which, through the rod 25, actuates the piston 4.

The device which has just been described operates as follows:

At each forward and backward stroke of the piston 4, the diaphragm 2 oscillates between the two heads 3a and 3b thereby varying the volume of the part of the body of the pump 1 which contains pumped liquid.

Furthermore at each forward and backward stroke, the pump 15 introduces an additional amount of liquid into the motive chamber 4a and into the regulating chamber 20.

The portion 9a of the slide valve 9 normally obturates the return pipe 12. On the lower face of the diaphragm 7 is exerted the pressure of the pumped liquid, and on the upper face, the pressure of the motive liquid contained in the chamber 20. The strength of the spring 10 is adjusted so that the slide valve 9 moves down when there is a predetermined excess of the pressure of the motive liquid over the pumped liquid, for example 500 grs./sq. cm. Consequently, this slide valve moves down thus allowing the liquid contained in the chamber 20 to flow through the pipe 12 every time the pressure in the chamber 20 exceeds a predetermined pressure relatively to that of the pumped liquid. The motive liquid of the chamber 4a equalizes its pressure with that of the liquid contained in the chamber 20, through the valve 11, so that the difference in pressure exerted on the motive diaphragm 2 remains limited, during the whole discharge stroke, to the predetermined differential pressure which ensures the downward displacement of slide valve 9.

Thus, when the discharge pressure of the pumped liquid decreases, at the valve 6, the diaphragm 2 is only pressed against the head 3a by this pre-limited differential pressure. The valve 11 prevents the piston 4 from sucking up liquid contained in the chamber 20, while the valve 21 prevents the direct return of the liquid from the tank 16 into this chamber 20 through the pipe 12.

A numerical example will clearly illustrate the advantage of the regulation according to the invention. In the conventional types of diaphragm pumps comprising an additional pump such as 15, this pump is provided with an automatic valve which is designed to open at an absolute pressure slightly greater than the maximum discharge pressure of the piston 4.

If this maximum pressure is for example 20 kgs./sq. cm., the said automatic valve is adjusted so as to open at a pressure of say 20.5 kgs./sq. cm. At the end of the stroke of the diaphragm towards the head 3a, this diaphragm is applied against this head by the difference between the adjusted pressure of the said automatic valve (greater than the maximum discharge pressure) and this discharge pressure.

When the discharge pressure falls for example to 10 kgs./sq. cm. at the end of the stroke of the diaphragm, the latter is pressed against the head 3a with a pressure of $20.5 - 10 = 10.5$ kgs./sq. cm., which pressure may be detrimental to the diaphragm. On the contrary, with the device according to the invention, the maximum differential pressure to which the diaphragm is subjected remains always equal, whatever be the discharge pressure, to the predetermined difference, that is to say 500 grs./sq. cm. in the present example. In example shown in Fig. 1, the additional motive liquid is, at each stroke of the piston 4, discharged under pressure into the chamber 4a by the pump 15.

In the embodiment shown in Fig. 2, the pump 15 is done without and an amount of additional liquid is on the contrary sucked up from the tank 16 through a calibrated valve 27 by the piston 4.

This valve is calibrated so as to open at a pressure which, taking into account the load $h$, is slightly lower than the absolute suction pressure. Thus a certain amount of motive liquid is introduced into the chamber 4a at each suction stroke of the piston 4. During the discharge stroke of the piston 4 and of the diaphragm 2, the additional diaphragm 7 acts, as before, in order to limit the differential pressure on the diaphragm 2 to the predetermined value corresponding to the calibration of the spring 10. However, in this case, the load $h$ of the valve 27 adds up to the atmospheric pressure, the variation of which may affect the opening condition of this valve, so that the use of an auxiliary additional pump is preferred.

What I claim is:

1. A diaphragm pump comprising a pump casing, a diaphragm dividing said pump casing into two compartments, one of which has at least two openings, duct means for liquid to be pumped connected through at least one of said openings with the corresponding compartment, motive liquid in the other compartment, means for cyclically varying the volume of the said other compartment, means for introducing an additional amount of motive liquid at each cycle of variation of the volume of said other compartment, a further diaphragm adapted to obturate another opening of the former mentioned compartment, a hollow member surrounding the said other opening outside the said former mentioned compartment, said member forming with the said further diaphragm an enclosure having an outlet, piping means connecting said other compartment with the said enclosure, valve means operatively connected with the said further diaphragm for controlling the said outlet, and spring means urging said valve means towards closing position.

2. Pumps as claimed in claim 1, further comprising a motive liquid tank, piping means between the said outlet and the said tank, and means for tapping the additional liquid from the said tank.

3. Pump as claimed in claim 2, further comprising a check valve in the piping means connecting the said outlet with the said tank.

4. Pump as claimed in claim 1, further comprising a check valve in the said piping means connecting the other compartment with the enclosure.

5. Pump as claimed in claim 1, wherein the valve means comprises a slide valve movable axially of the hollow member and fast with the central part of the further diaphragm.

References Cited in the file of this patent
UNITED STATES PATENTS

| | | |
|---|---|---|
| 2,289,617 | Wood | July 14, 1942 |
| 2,593,255 | Bowman | Apr. 15, 1952 |